US011870962B2

United States Patent
Yoshida

(10) Patent No.: US 11,870,962 B2
(45) Date of Patent: Jan. 9, 2024

(54) INFORMATION PROCESSING DEVICE AND IMAGE FORMING APPARATUS THAT COMMUNICATES WITH A USER TERMINAL OPERATED BY A USER VIA A NETWORK

(71) Applicant: KYOCERA Document Solutions Inc., Osaka (JP)

(72) Inventor: Toshinobu Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/049,182

(22) Filed: Oct. 24, 2022

(65) Prior Publication Data

US 2023/0126758 A1  Apr. 27, 2023

(30) Foreign Application Priority Data

Oct. 25, 2021 (JP) ................. 2021-173834

(51) Int. Cl.
*H04N 1/21* (2006.01)
*H04N 1/00* (2006.01)

(52) U.S. Cl.
CPC ......... *H04N 1/2179* (2013.01); *H04N 1/0097* (2013.01); *H04N 2201/218* (2013.01)

(58) Field of Classification Search
CPC ............. H04N 1/2179; H04N 1/0097; H04N 2201/218
See application file for complete search history.

(56) References Cited

U.S. PATENT DOCUMENTS

| 11,347,449 | B1* | 5/2022 | Badana | G06F 3/1222 |
| 2005/0073711 | A1* | 4/2005 | Dokuni | H04N 1/32101 358/1.14 |
| 2006/0221375 | A1* | 10/2006 | Nagarajan | G06F 3/1222 358/1.14 |
| 2007/0177920 | A1* | 8/2007 | Katano | G06F 21/629 400/76 |
| 2010/0157363 | A1* | 6/2010 | Ishikawa | G06F 3/1203 358/1.15 |
| 2010/0182643 | A1* | 7/2010 | Ito | G06F 3/1222 358/1.15 |
| 2010/0225946 | A1* | 9/2010 | Fukasawa | G06F 3/1204 358/1.13 |
| 2011/0063667 | A1* | 3/2011 | Nishida | G06F 21/608 358/1.15 |
| 2017/0034365 | A1* | 2/2017 | Uruma | H04N 1/0097 |

FOREIGN PATENT DOCUMENTS

JP  2006-168069 A  6/2006

* cited by examiner

*Primary Examiner* — Nicholas Pachol
(74) *Attorney, Agent, or Firm* — Studebaker & Brackett PC

(57) ABSTRACT

A correspondence relationship between user information and document data is stored as document management information. A user who has accessed an information processing device via a network is classified as a remote access user. In deletion of the document management information of the user classified as the remote access user together with the user information thereof, the document management information will remain stored if the to-be-deleted user information belongs to the user.

5 Claims, 4 Drawing Sheets

User information table

| User ID | Password | Setting information | Remote access user flag | Last access date and time |
|---------|----------|---------------------|-------------------------|---------------------------|
| USER_A | ***** | Color | true | 20XX/XX/XX |
| USER_B | ***** | A4 Monochrome, ... | false | 20XX/XX/XX |
| USER_C | ***** | A3, Monochrome, ... | true | 20XX/XX/XX |

46

Box information table

| User ID | Document box |
|---------|--------------|
| USER_A | XXX.XXX.XXX.XXX/BOX_A |
| USER_B | XXX.XXX.XXX.XXX/BOX_B |
| USER_C | XXX.XXX.XXX.XXX/BOX_C |

INFORMATION PROCESSING DEVICE AND IMAGE FORMING APPARATUS THAT COMMUNICATES WITH A USER TERMINAL OPERATED BY A USER VIA A NETWORK

INCORPORATION BY REFERENCE

The present application claims priority under 35 U.S.C. § 119 to Japanese Patent Application No. 2021-173834, filed on Oct. 25, 2021. The contents of this application are incorporated herein by reference in their entirety.

BACKGROUND

The present disclosure relates to an information processing device and an image forming apparatus.

Document data used by a user may be stored in an information processing device that is accessible through the user accessing the information processing device via a network using a user terminal. For example, an image forming apparatus (an example of the information processing device) such as a printing device (printer), which is connected to a network, stores print data sent by a user at a remote location.

The printing device deletes information related to the user through deletion processing of user information (information indicating the user). In deletion of the information related to the user, the printing device deletes data sent by the to-be-deleted user, that is, print data that becomes unnecessary.

SUMMARY

According to an aspect of the present disclosure, an information processing device that communicates with a user terminal operated by a user via a network, includes storage that stores information therein, and a controller that manages the information stored in the storage. The information stored in the storage includes user information indicating the user, document data used by the user, and document management information indicating a correspondence relationship between the user information and the document data. When the user accesses the information processing device using the user terminal, the controller classifies the user as a remote access user, and deletes the user information satisfying a predetermined deletion condition from the storage. When the user corresponding to the user information satisfying the deletion condition is not classified as the remote access user, the controller deletes, from the storage, the document data and the document management information corresponding to the user information satisfying the deletion condition. When the user corresponding to the user information satisfying the deletion condition is classified as the remote access user, the controller causes the storage to remain storing the document data and the document management information corresponding to the user information satisfying the deletion condition.

Moreover, according to another aspect of the present disclosure, an image forming apparatus that communicates with a user terminal operated by a user via a network, includes a storage that stores information, and a controller that manages the information stored in the storage. The information stored in the storage includes user information indicating the user, document data used by the user, and document management information indicating a correspondence relationship between the user information and the document data. When the user accesses the information processing device using the user terminal, the controller classifies the user as a remote access user, and deletes the user information satisfying a predetermined deletion condition from the storage. When the user corresponding to the user information satisfying the deletion condition is not classified as the remote access user, the controller deletes, from the storage, the document data and the document management information corresponding to the user information satisfying the deletion condition. When the user corresponding to the user information satisfying the deletion condition is classified as the remote access user, the controller causes the storage to remain storing the document data and the document management information corresponding to the user information satisfying the deletion condition.

BRIEF DESCRIPTION OF THE DRAWINGS

FIG. 2 illustrates respective examples of a user information table and a box information table.

DETAILED DESCRIPTION

Figure 1:
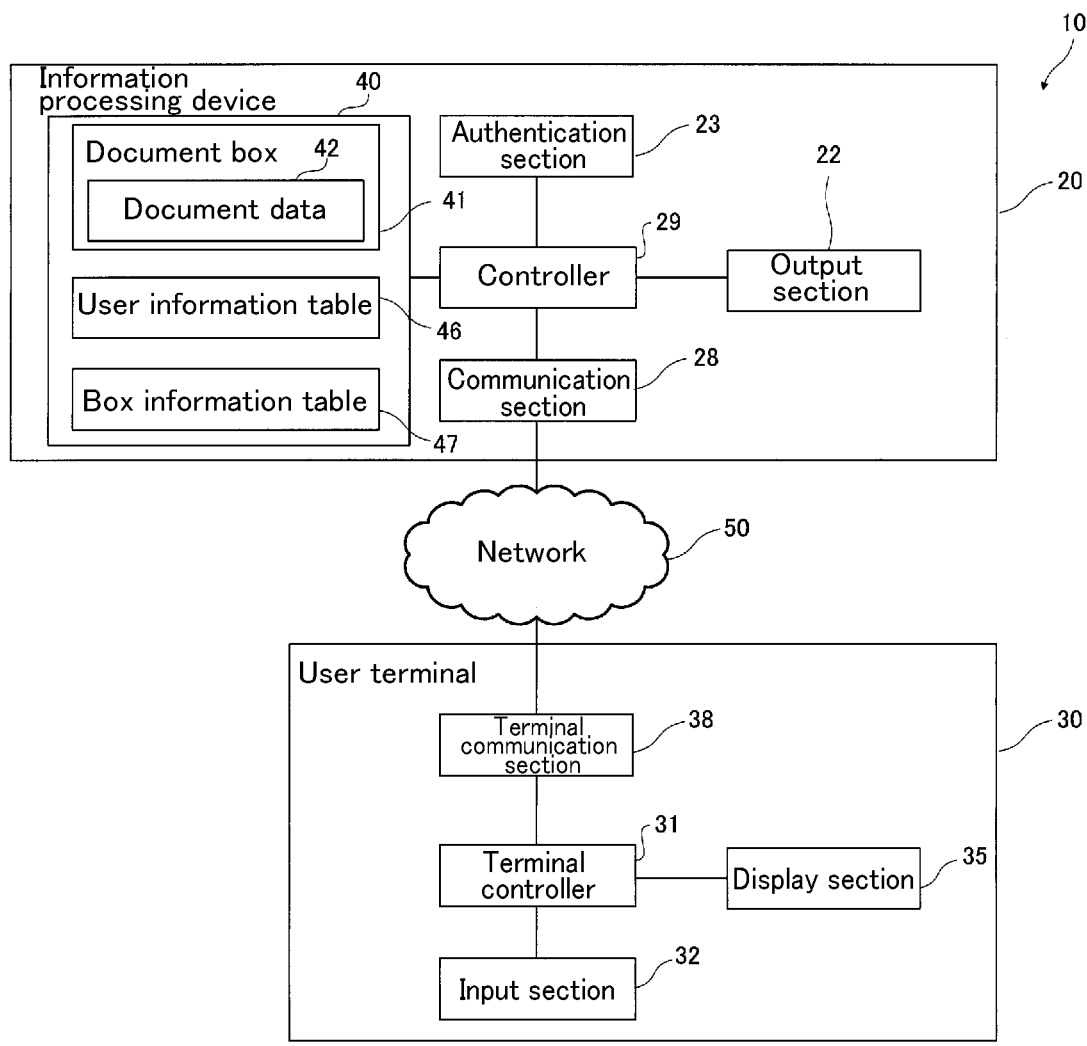
FIG. 1 is a block diagram of a network system including an information processing device as an example of an embodiment.

FIG. 1 is a block diagram of a network system 10 according to an embodiment. The network system 10 includes a user terminal 30 and an information processing device 20 as an example of the embodiment. In the network system 10, the information processing device 20 and the user terminal 30 that is operated by a user are connected to each other via a network 50 (e.g., the Internet). The information processing device 20 is an image forming apparatus, for example. The information processing device 20 may be any devices as long as it can manage user information and store data through user operation via the network 50. Examples of the information processing device 20 include a file server and a mail server. The present embodiment will now be described by giving an example of a case in which the information processing apparatus 20 is an image forming apparatus.

The image forming apparatus is a unit that performs image formation on a recording medium such as paper based on document data specified by the user. Typically, the image forming apparatus is a printing device (printer) and prints an image indicated by document data on the recording medium. It should be noted that, in the present embodiment, image formation generally refers to visual reproduction of information indicated by specified data on a recording medium. Examples of the image formation includes printing character strings, printing on cloth and resin sheets, and building a three-dimensional object by a 3D printer.

(Configuration of Information Processing Device 20)

The information processing device 20 in FIG. 1 includes an output section 22, an authentication section 23, a communication section 28, and a controller 29. The controller 29 performs overall control on the information processing device 20, and is constituted by a microcomputer or a processor, for example.

The information processing device 20 also includes a device (storage device) that stores electronic information, such as a hard disk drive (HDD) or a solid state drive (SSD). A part of the storage area of the storage device is used as storage 40 to be used by the user. According to the information processing device 20 in FIG. 1, the storage 40 includes a document box 41, a user information table 46 and a box information table 47. The controller 29 manages information stored in the storage 40. That is, the controller 29 manages the information stored in the storage 40.

The document box 41 stores therein document data 42 sent by users to the information processing device 20. The user information table 46 stores therein, as user information indicating users, information related to the users such as user IDs unique to the users. The box information table 47 stores therein, as box information (an example of the document management information), a correspondence relationship between the user information and the document data 42 (i.e., a correspondence relationship between each user and corresponding document data 42).

The document data 42 stored in the document box 41 is the data for use which is sent by the user to the information processing device 20. In a case in which the information processing device 20 is an image forming apparatus, the document data 42 refers to general data that can be used for image formation. Typical examples of data usable for image formation include image data and character data. Any data can be the document data 42 as long as it can be converted into image data suitable for image formation by appropriate processing.

In addition, the document box 41 included in the storage 40 of the present embodiment includes a plurality of document boxes 41. The document boxes 41 are associated with the respective users. The document data 42 sent by each user to the information processing device 20 is stored in corresponding one of the document boxes 41 corresponding to one of the users who has sent it. Although FIG. 1 illustrates only one document box 41 and one piece of document data 42 for simplification, the storage 40 includes a plurality of document boxes 41 as described above. In addition, each document box 41 stores therein multiple pieces of document data 42.

The user information table 46 includes data listing various types of information required for each user to use the information processing device 20, for example. Specifically, as illustrated in FIG. 2, the user information table 46 stores therein, as the user information indicating the user, data in which user IDs, passwords required for authentication, and setting information are associated with each other on a user by user basis, for example.

Here, the setting information is information listing data specifying an operation of the information processing device 20 in response to a user's operation when the user uses the information processing device 20. For example, the image forming apparatus (printing device) stores therein, as setting information, printing options such as paper size (e.g., A4 or A3) and color designation (e.g., color or monochrome) according to a print instruction sent by the user.

The box information table 47 includes box information (document management information) data indicating a correspondence relationship between the user and the document data 42 stored in the document box 41 (i.e., a correspondence relationship between the user information and the document data 42). Specifically, as illustrated in FIG. 2, the box information table 47 stores box information in which the user ID is associated with the storage area information (e.g., folder path) of the document box 41 for each user, for example.

The output section 22 of the information processing device 20 has a function of outputting either or both a result of information processing performed according to the user operation on the information processing device 20 and a notification from the network system 10. In a case in which the information processing device 20 is an image forming apparatus, the output section 22 is a device that performs image formation (printing). A monitor that displays notifications from the network system 10 also functions as the output section 22. Examples of notifications that the image forming apparatus receives from the network system 10 include notifications of lack of recording medium (out of paper) and physical failures (e.g., paper jams) in image forming processing.

The authentication section 23 has a function of confirming (user authentication) whether or not a user who is accessing the information processing device 20 via the network 50 is an authorized user. For example, the authentication section 23 compares a combination of a user ID and a password transmitted from the user terminal 30 operated by the user with the user information table 46 for authentication of the user.

The information processing device 20 is connected to the network 50 by the communication section 28 and communicates with the user terminal 30 operated by the user via the network 50.

(Configuration of User Terminal 30)

The user terminal 30 is a terminal device that the user operates at a location remote from the information processing device 20. Specifically, the user terminal 30 may be a home computer such as a desktop computer (personal computer) or a portable information device, for example. Examples of the portable information device include notebook computers, smart phones, and tablet devices.

The user terminal 30 includes a terminal controller 31, an input section 32, a display section 35 and a terminal communication section 38. The terminal controller 31 has a function of performing overall control on the user terminal 30, and includes a microcomputer or a processor, for example.

The input section 32 has a function of receiving user input. The input section 32 may be a keyboard and a mouse of a desktop computer or a touch panel of a smart phone, for example. In a case in which an ID card storing user authentication information therein is used for network authentication, the input section 32 may be a card reader for reading information on the ID card.

The display section 35 displays either or both a result of a user operation input to the input section 32 and a notification from the network system 10. The display section 35 is a display, for example. The terminal communication section 38 has a function of communication between the user terminal 30 and the information processing device 20 via the network 50. Specifically, the terminal communication section 38 is an Ethernet (registered Japanese trademark) card or a wireless communication device, for example.

(Image Formation Via Network 50)

The following describes a case in which the user uses the information processing device 20, which is an image forming apparatus, to form an image via the network 50. First, the user inputs information (authentication information) for network authentication to the input section 32. Examples of a manner to input information for network authentication include holding an ID card over a card reader and inputting a user ID and password using a keyboard.

The authentication information input to the input section 32 is transmitted to the information processing device 20 via the terminal communication section 38 and the network 50. In response to the information processing device 20 receiving the authentication information, the authentication section 23 of the information processing device 20 determines whether or not the transmitted authentication information is stored in the user information table 46. If the user is pre-registered as a user who uses the information processing device 20, the authentication information of the user is stored in the user information table 46.

If the transmitted authentication information is not stored in the user information table 46, the authentication section 23 notifies the controller 29 of an authentication result indicating that the user corresponding to the received authentication information is a user not registered in the information processing device 20. The controller 29 transmits, to the user terminal 30, a notification indicating that access by the user is not allowed. Thereafter, the display section 35 of the user terminal 30 displays the notification indicating that access is not allowed. In this case, the display section 35 may also display a notification prompting user registration (e.g., guidance to a Web page for user registration).

(Remote Access User Classification Processing)

The controller 29 executes remote access user classification processing. The remote access user classification processing will now be described as follows. If the user information table 46 stores therein the authentication information transmitted from the user terminal 30, the authentication section 23 transmits, to the controller 29, an authentication result indicating that the user corresponding to the transmitted authentication information is a user registered in the information processing device 20. The controller 29 transmits, to the user terminal 30, a notification indicating access allowance for the user. Meanwhile, the controller 29 writes in the user information table 46 information indicating that the user who has performed the network authentication is a "remote access user". As a result, the user who has just accessed is classified as a remote access user. As illustrated in FIG. 2, the user information table 46 include a data item named "remote access user flag". The controller 29 activates (sets to "true") a "remote access user flag" of the user classified as the remote access user, for example.

Upon receiving the notification indicating access allowance to the information processing device 20, the user operates the user terminal 30 to transmit the document data 42 used for image formation to the information processing device 20, for example. In response to receiving the document data 42, the controller 29 confirms the box information table 47, acquires a path of a document box 41 corresponding to the user who has sent the document data 42, and stores the received document data 42 to the appropriate document box 41. Thereafter, the controller 29 transmits the document data 42 to the output section 22. The output section 22 executes image formation based on the document data 42.

Image formation via the network 50 is executed as described above. The above has described a case in which the information processing device 20 includes the output section 22. It should be noted that the user terminal 30 may include the output section 22. In this case, the user terminal 30 may be set to be allowed to use the output section 22 only when the user is determined as a registered user by the network authentication.

(User Information Deletion Processing)

The controller 29 executes user information deletion processing. The user information deletion processing will now be described as follows. The controller 29 of the information processing device 20 deletes user information that satisfies a predetermined deletion condition. A specific example of the deletion condition is when the user has not accessed the information processing device 20 for a specific period of time (e.g., one month). In other words, the controller 29 deletes, from the user information table 46, the user information of a user who has not accessed the information processing device 20 for the specific period of time. It should be noted that the user information table 46 may include an item named "last access date and time" as illustrated in FIG. 2 for calculating the period during the user has not access the information processing device 20. For example, the "last access date and time" item stores, information indicating the date when the user accessed last the information processing device 20. The user information table 46 may also include an item named "expiration date". The "expiration date" item stores information indicating the expiration date of a user information when the user registers in the information processing device 20, for example. In the present embodiment, the expiration date refers to a date when the user information is to be deleted.

Figure 3:
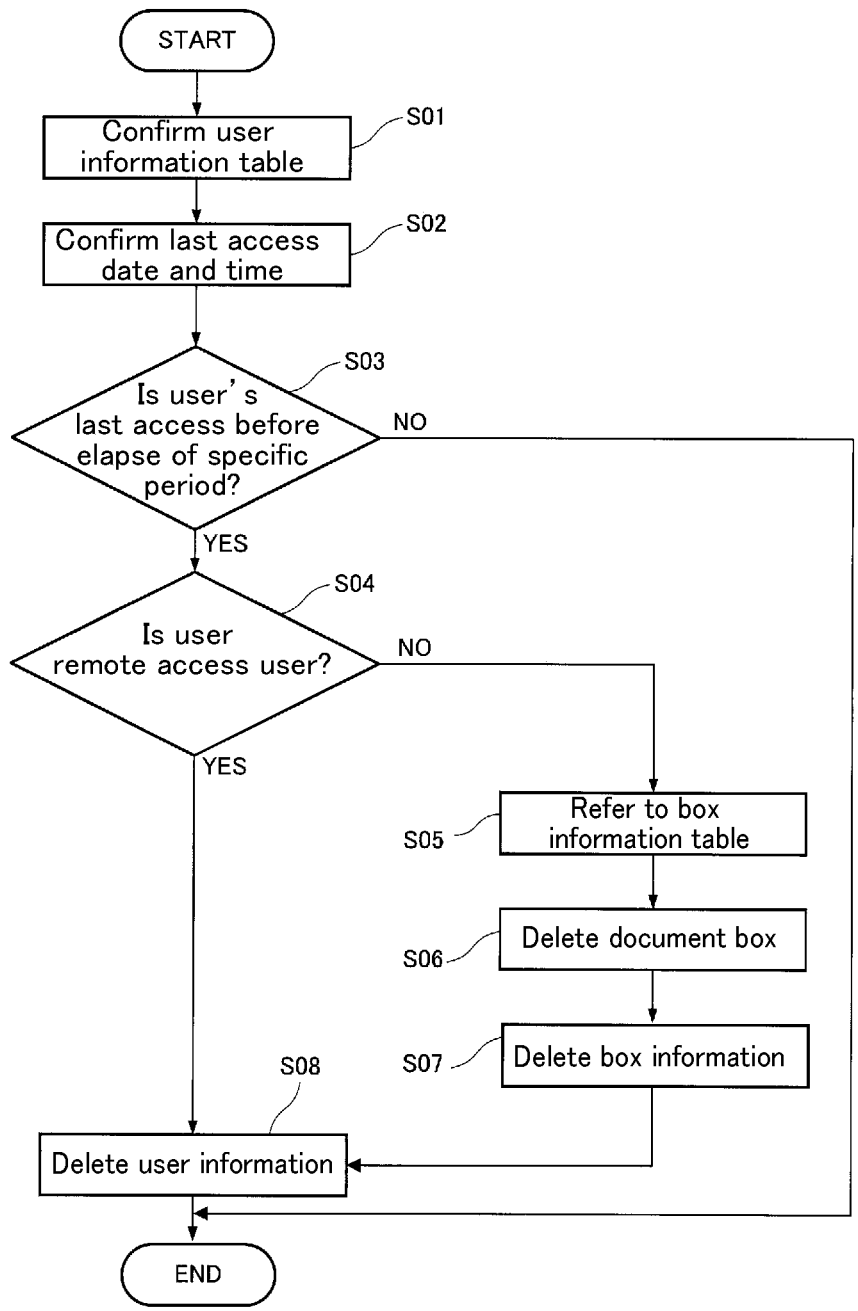
FIG. 3 is a flowchart illustrating deletion processing of user information and document management information.

FIG. 3 is a flowchart illustrating the user information deletion processing, which is automatically executed by the controller 29 periodically (e.g., once a month). The user information deletion processing is executed for the entire user information table 46, that is, for user information of each user. For simplification of explanation, the following describes the user information deletion processing for a specific (single) user among the users. Referring to FIG. 3, the controller 29 starting processing (START) confirms the user information table 46 first (step S01). The controller 29 confirms the data item named "last access date and time" in the user information table 46 (Step S02), and determines whether or not the last access date and time is before elapse of a specific period (e.g., one month) (Step S03). If the last access date and time is before elapse of the specific period (NO in Step S03), the controller 29 ends the user information deletion processing without deleting the user information from the user information table 46 (END). If the last access date and time after elapse of the specific period (YES in Step S03), the controller 29 deletes the user information from the user information table 46.

In deleting the user information, the controller 29 determines whether or not the user corresponding to the to-be-deleted user information is a remote access user (Step S04). If the user corresponding to the to-be-deleted user information is not a remote access user (NO in Step S04), the controller 29 refers to the box information table 47 (Step S05). The controller 29 confirms the document box 41 corresponding to the to-be-deleted user information based on the box information that is associated with the to-be-deleted user information, and that is stored in the box information table 47. Thereafter, the controller 29 deletes the document box 41 (and the document data 42 stored in the document box 41) corresponding to the user ID of the to-be-deleted user information (Step S06). Moreover, the controller 29 deletes the box information (document management information) associated with the to-be-deleted user information from the box information table 47 (Step S07), and also deletes the user information from the user information table 46 (Step S08). Then the controller 29 ends the user information deletion processing (END).

If the user corresponding to the to-be-deleted user information is the remote access user by contrast (YES in Step S04), the controller 29 executes the processing of deleting the user information from the user information table 46 (Step S08). However, the controller 29 ends the user information deletion processing without deleting (i.e., maintains the storage of) the document box 41 and the box information that correspond to the to-be-deleted user information (END).

In the present embodiment, a remote access user whose user information has been deleted (deleted user) can be re-registered as a user of the information processing device 20 in order to re-use the document data 42 stored in a corresponding one of the document boxes 41. A user whose user information remains deleted cannot access the information processing device 20, and must perform user registration to the information processing device 20 again. Since the box information of the user whose user information has been deleted remains in the document box 41, the user whose user information has been deleted can use the document data 42 upon registration using the same user ID as used before.

It should be noted that it may be necessary to delete the entire use history of the information processing device 20 by a remote access user in a case in which the remote access user does not use the network system 10 any more for some reasons such as change of information processing device 20 or career change. When deleting the entire use history of the information processing device 20 used by the remote access user, the administrator of the network system 10 or the information processing device 20 may delete the box information, the document box 41, and the document data 42 together with the user information for the remote access. In other words, even in a case in which a user corresponding to the to-be-deleted user information is a remote access user, the administrator may delete the box information (document management information), the document box 41, and the document data 42 corresponding to the to-be-deleted user information when deleting the user information.

(Case in which Login History at Satellite Office is Stored)

In the above embodiment, a user who has been authenticated is classified as the remote access user. Alternatively, a user having a login history at a remote location (satellite office) may be classified as the remote access user.

Figure 4:
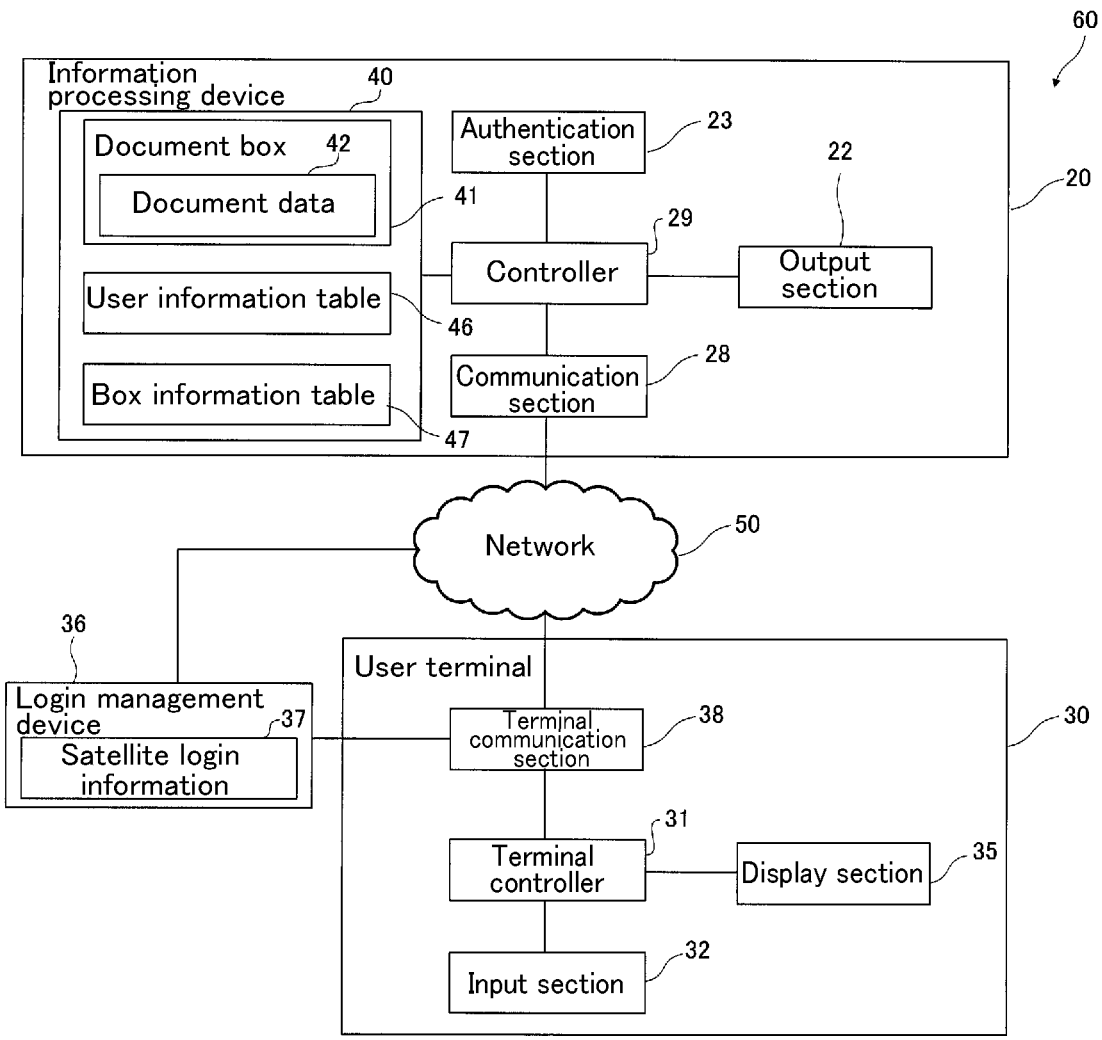
FIG. 4 is a block diagram of a network system including an information processing device as an example of another aspect of the embodiment.

FIG. 4 is a block diagram of a network system 60 in which the login history at the satellite office is stored. According to the example illustrated in FIG. 4, it is assumed that the information processing device 20 is located at a main office (head office) and the user terminal 30 is located at a remote location (satellite office).

The user terminal 30 in FIG. 4 communicates with the login management device 36 located at the satellite office. The login management device 36 is an image forming apparatus installed in the satellite office, for example. It should be noted that the login management device 36 may be any devices as long as it can store a login history of a user in the satellite office. For example, the login management device 36 may be a computer dedicated to storing user's login history. Communication between the user terminal 30 and the login management device 36 may be wireless communication (e.g., short-range wireless communication). Alternatively, the user terminal 30 and the login management device 36 may be connected by wires for wired communication as illustrated in FIG. 4. The login management device 36 stores therein login histories of users in the satellite office (remote system). Specifically, for example, the login management device 36 stores therein satellite login information 37 in which the user ID of a user and information indicating the last login date and time of the user in the satellite office are associated with each other. In other words, the satellite login information 37 contains a user ID and information indicating the last login date of each user in the satellite office. When the user logs in (logs into the remote system) at the satellite office, the satellite login information 37 is stored.

The controller 29 of the information processing device 20 can refer to the satellite login information 37 managed by the login management device 36 by communicating with the login management device 36 via the network 50. The controller 29 periodically (e.g., every month) refers to the satellite login information 37 managed by the login management device 36 via the network 50. When the satellite login information 37 contains a user ID stored in the user information table 46, the controller 29 activates the remote access user flag corresponding to the user ID (classifies the user as a remote access user).

The network system 60 in FIG. 4 also classifies a user as a remote access user without network authentication as long as the user has a login history at the satellite office. Therefore, the box information (document management information) will remain stored even for a user having had no chance to perform network authentication with a result that the user information has been deleted or expired, as long as the user has a login history at the satellite office.

According to the information processing device 20 (image forming apparatus) of the above embodiment, when the user information of a user is deleted from the information processing device 20, the storage of the management information (box information) of the document data 42 of the user can remain stored depending on the situation. Specifically, even the information processing device 20 at the main office has deleted the information of a remote access user who works at a satellite office for a long period of time, the storage 40 remains storing the storage of the document box 41 used by the remote access user.

Even a remote access user transferred to the main office can still use the document data 42 in the document box 41 which remains stored in the storage 40 of the information processing device 20.

As such, the document data 42 stored in the information processing device 20 will not be lost even when a user who has worked at the satellite office for a long period of time transferred to the main office. Therefore, the user is possible to smoothly transfer from the satellite office to the main office without losing the document data 42 stored in the information processing device 20.

The above embodiment has described a case where the storage 40 automatically delete the user information of a user who has not accessed the information processing device 20 for a specific period of time as an example. The condition for user information automatic deletion may be other predetermined conditions. For example, the condition for user information automatic deletion may be a notification of transfer to the satellite office from the user. The notification of transfer to the satellite office means that the user who is decided to transfer to the satellite office notifies the information processing device 20 under network authentication that he or she will transfer to the satellite office. In this case, the storage 40 deletes the user information of the user while remaining storing the box information and the document box 41 of the user.

An embodiment of the present disclosure has been described above with reference to the accompanying drawings. However, the present disclosure is not limited to the above embodiment and can be implemented in various manners within a scope not departing from the gist thereof. The drawings mainly illustrate various constituent elements schematically for ease of understanding. Aspects such as thickness, length, number and intervals of the constituent elements illustrated in the drawings may differ in practice for convenience of drawing preparation. In addition, materials, shapes, dimensions of the elements described in the above embodiment are examples and are not particularly limited. Various changes can be made within the scope that does not deviate from the configuration of the present disclosure.

What is claimed is:

1. An information processing device that communicates with a user terminal operated by a user via a network, comprising:
    storage that stores information; and
    a controller that manages the information stored in the storage,
    the information stored in the storage includes user information indicating the user, document data used by the user, and document management information indicating a correspondence relationship between the user information and the document data,
    when the user accesses the information processing device using the user terminal, the controller classifies the user as a remote access user,
    when the user information satisfies a predetermined deletion condition, the controller deletes the user information from the storage,
    when the user indicated in the user information satisfying the deletion condition is not classified as the remote access user, the controller deletes, from the storage, the document data and the document management information each associated with the user information satisfying the deletion condition,
    when the user indicated in the user information satisfying the deletion condition is classified as the remote access user, the controller causes the storage to remain storing the document data and the document management information each associated with the user information satisfying the deletion condition.

2. The information processing device according to claim 1, further comprising
    an authentication section that determines whether or not the user information of the user who trying to access the information processing device via the network is stored in the storage, wherein
    when the user accesses the information processing device via the network under the network authentication, the controller classifies the user as the remote access user.

3. The information processing device according to claim 1, wherein
    the controller refers to satellite login information stored upon a user logged into a system at a remote location separate from the information processing device, and classifies, as the remote access user, the user who has a remote login history contained in the satellite login information.

4. The information processing device according to claim 1, wherein
    when the user information is deleted from the storage by operation by an administrator, the controller deletes the document data and the document management information each associated with the user information deleted from the storage even if the user indicated in the user information deleted from the storage is the remote access user.

5. An image forming apparatus that communicates with a user terminal operated by a user via a network, comprising:
    storage that stores information therein; and
    a controller that manages the information stored in the storage,
    the information stored in the storage includes user information indicating the user, document data used by the user, and document management information indicating a correspondence relationship between the user information and the document data,
    when the user accesses the information processing device using the user terminal, the controller classifies the user as a remote access user,
    when the user information satisfies a predetermined deletion condition, the controller deletes the user information from the storage,
    when the user indicated in the user information satisfying the deletion condition is not classified as the remote access user, the controller deletes, from the storage, the document data and the document management information each associated with the user information satisfying the deletion condition,
    when the user indicated in the user information satisfying the deletion condition is classified as the remote access user, the controller causes the storage to remain storing the document data and the document management information each associated with the user information satisfying the deletion condition.

* * * * *